United States Patent [19]

Hofmann

[11] Patent Number: 4,736,830
[45] Date of Patent: Apr. 12, 1988

[54] PRODUCTION LINE SYSTEM

[75] Inventor: Fritz Hofmann, Beinwil am See, Switzerland

[73] Assignee: Maschinenfabrik AG Menziken, Menziken, Switzerland

[21] Appl. No.: 903,513

[22] Filed: Sep. 3, 1986

[30] Foreign Application Priority Data

Sep. 9, 1985 [CH] Switzerland ............... 03877/85
Sep. 9, 1985 [CH] Switzerland ............... 03878/85

[51] Int. Cl.$^4$ ............................................. B65G 47/00
[52] U.S. Cl. ................................................... 198/345
[58] Field of Search ............... 198/345, 465.1, 465.2, 198/465.3, 803.01, 803.2; 29/563, 33 P

[56] References Cited

U.S. PATENT DOCUMENTS

| | | | |
|---|---|---|---|
| 3,155,217 | 11/1964 | Cross | 198/345 |
| 3,666,076 | 5/1972 | Miller et al. | 198/345 |
| 3,888,341 | 6/1975 | Konkal et al. | 198/345 |
| 4,201,284 | 5/1980 | Brems | 198/465.1 X |
| 4,253,559 | 3/1981 | Myers et al. | 198/345 |
| 4,257,513 | 3/1981 | Siarto | 198/345 |
| 4,360,097 | 11/1982 | Brems | 198/345 |
| 4,492,297 | 1/1985 | Sticht | 198/345 |
| 4,502,585 | 3/1985 | Sticht | 198/345 |
| 4,561,819 | 12/1985 | Wiernicki | 198/345 X |
| 4,570,782 | 2/1986 | Cargill et al. | 198/345 |

FOREIGN PATENT DOCUMENTS

| | | |
|---|---|---|
| 2340332 | 2/1975 | Fed. Rep. of Germany . |
| 2845913 | 4/1980 | Fed. Rep. of Germany . |
| 3107396 | 10/1982 | Fed. Rep. of Germany . |
| 3328290 | 2/1985 | Fed. Rep. of Germany . |
| 865417 | 4/1961 | United Kingdom ............ 29/33 P |

Primary Examiner—Kenneth J. Dorner
Assistant Examiner—José V. Chen
Attorney, Agent, or Firm—Frishauf, Holtz, Goodman & Woodward

[57] ABSTRACT

To provide for low-noise, low-shock operation, transport plates which, preferably, are essentially square and have, on two adjacent sides, recessed elastic material (31), the opposite sides being formed with projections to engage against the elastic material. A transport belt arrangement, having two spaced belts, moves the transport plates continuously. If a transport plate is to be arrested at a work station (WS), a presser plate (5) is lifted upwardly, preferably by a piston-cylinder unit (8) to lift the transport plate off the belts and engage the presser plate with a stationary, preferably three-point counter bearing (28), with sufficient holding force to provide a back-up for working tools, for example a drill press, boring machine or the like, operating on a work piece (23) secured to the transport plate. The transport plate is positively positioned by locating pins, posts or bolts (12, 26, 32) movable with the presser plate, or independently thereof, and engageable with recesses formed within the transport plate or in the shape of essentially semicircular U cuts positioned centrally in the sides of the transport plates.

22 Claims, 5 Drawing Sheets

PRODUCTION LINE SYSTEM

The present invention relates to a production line system, and more particularly to an arrangement to move work pieces mounted on transport plates in a production line, while permitting working on the work pieces at transport stations without interrupting the movement of running transport belts so that, at sequential work stations, the necessary work can be carried out and, as soon as finished, the work pieces together with their transport plates can be moved to the next work station; and to transport plates particularly adapted for use in such a system.

BACKGROUND

Various types of production line systems are known; usually, the production line systems include a linear transport system to move work pieces on transport plates. The transport plates are moved either by conveyor belts, roller conveyors or the like to various work stations. The work stations may be manually operated, that is, may use human operators, for example for assembly or other work; the work stations may, however, also include automatic operating stations, automatic assembly, or connecting stations, stations which are located opposite robots, or similar arrangements. The particular nature of the production line, and the specific working on the work pieces does not form part of the present invention.

The transport plates which carry the work pieces may be movable along the production line in a plurality of horizontal directions. Customarily, the work pieces are movable first along a linear path, then along a path at right angles thereto, and then, again, for example in a linear path. The system may, for example, be generally U-shaped or may be a closed ring system, in which work pieces are mounted on the transport plates at a specific location at the ring system, and worked-on or assembled work pieces removed immediately adjacent thereto, to free the transport plates which are being recycled. The horizontal movement of the transport plates—in whatever selected direction—should be independent of the cadence or time taken to carry out the required work at the respective work stations. Consequently, it may occur in such transport systems that the transport plates, during their transport from one work station to the next may back up and impinge against each other, that is, be immediately adjacent each other. The movement of the transport plates, then, will be in steps, and jolts will be caused; the transport belts or rollers or other transport systems continue to move, which causes wear on the transport or conveyor system, the transport plates, and additionally introduces noise and shock:

THE INVENTION

It is an object to improve an assembly line system such that transport plates which are transported to work stations are reliably stopped at the work stations, precisely positioned thereon, without stopping the transport or conveyor system; in which slipping of conveyor or transport arrangement with respect to the transport plates at the work stations is prevented, so that wear and noise are eliminated; and to provide transport plates which are particularly suitable for such a system and can operate with a minimum of wear while generating a minimum of noise in operation.

Briefly, a pair of conveyor elements, for example belts, rollers, or the like, are located along the assembly line; a gap is left between the conveyor elements which, thus, will form transport means which move continuously. The work pieces are mounted on transport plates which are formed with positioning recesses, preferably adjacent the circumference thereof. The transport plates are positively positioned at the respective work station and disengaged from the conveyor rollers or belts or similar transport means by vertically movable positioning elements which are located for vertical movement in the gap between the pair of transport means, engageable with the recesses in the transport plates. Vertically operable lifting means are coupled to move the positioning means vertically, thereby lifting the transport plates off the transport conveyor belts or the like; counter elements are provided against which the lifting means press the transport plates. The lifting means, preferably, are fluid piston-cylinder combinations, for example operated by hydraulic or similar pressure fluid, to accept substantial counter-directed forces, for example operation of drills or milling machines on work pieces which are mounted on the transport plates and exert downwardly directed forces on the work pieces, and hence on the transport means, to be accepted by the lifting means.

Preferably, the counter elements provide a three-point counter support which is stationary; three-point counter supports can be readily adjusted for precise alignment, for example precise horizontal alignment, so that the work pieces can be worked on with precision by, for example, automatic article insertion or other apparatus.

The transport plates, in accordance with a feature of the invention, are polygonal, for example rectangular, hexagonal, octogonal, or the like; opposite surfaces are formed with matching projections and recesses, the recesses being lined with a shock absorbing material, such as rubber, a plastic elastomer or the like. The arrangement is so made that the projection of one plate will fit into the recess of an adjacent plate; the elastic shock absorbing material provides for elastic engagement of a transport plate which is moved by the conveyor against another element which, for example, may be stopped. Wear and tear and noise are substantially eliminated.

The system has the advantage that it is easily possible to locate work stations which may be manual or automatic or use robots, all along a single production line, without stopping the transport element and without requiring operation on the work pieces in a predetermined synchronized cadence; rather, the operation on the work pieces can be carried out without reference to any specific time clock while accurately and precisely positioning the work pieces at the respective work stations.

The counter elements preferably have non-metallic surfaces facing the transport plates; for example, they are lined with rubber or rubber-like elastic material, so that shocks, chatter and back-bounce upon engagement of the transport plates therewith are effectively avoided; additionally, the noise level is substantially reduced. The elements which stop the transport plates at a predetermined position, for example for stopping the transport at a work station, likewise preferably includes noise dampening and shock eliminating elastic material, such as rubber or similar material; once the transport plates are stopped, the positioning elements can precisely position the transport plates. The stopping action itself, however, need not stop the transport plates precisely at a predetermined position, again, in order to avoid shocks, bounce-back and noise.

DRAWINGS

DETAILED DESCRIPTION

Figure 5:
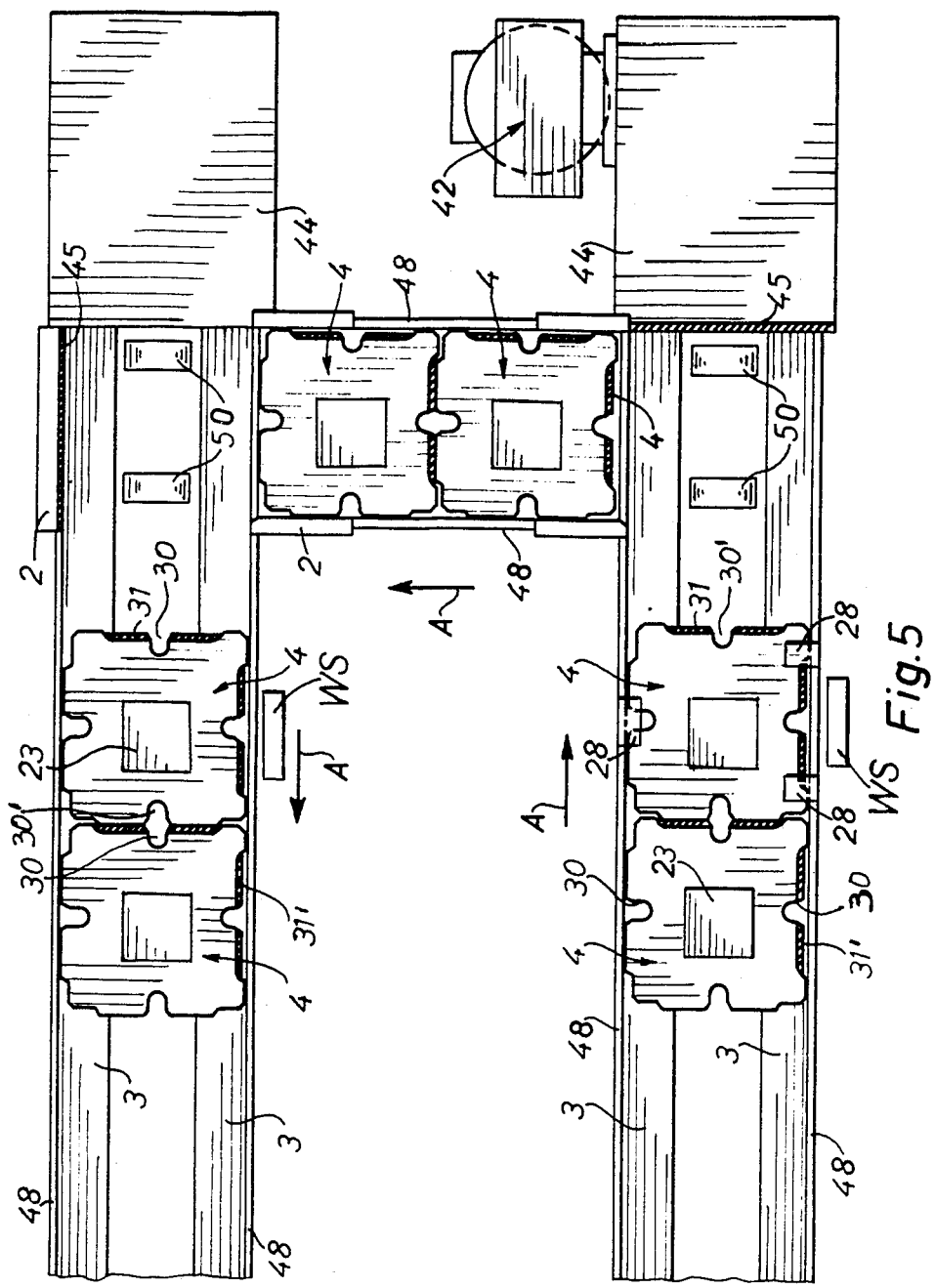
FIG. 5 is a schematic top view of the overall system, in which the transport plates are moved in several direction.

The overall production line system is shown in FIG. 5; a frame 2 supports the production line. A plurality of work stations, schematically indicated by the blocks WS, are located along the production line. Only two such work stations are shown; any number, of course, can be used, and the work stations can be located anywhere, inside or outside of the fragmentary U, as desired.

FIG. 5 illustrates a linear transport system in which square transport plates 4 are moved in horizontal direction in a U path, moving in accordance with the A-A-A. Other arrangements of the production line system are possible, particularly moving the transport plates in a path which is generally Z-shaped. The transport plates are loosely positioned on a pair of conveyor belts 3, which are driven from a motor 42 via a suitable gearing and drive system 44. The transport plates are moved laterally from one linear path to another by roller conveyors 50. The transport plates 4 are laterally guided by parallel side walls 48. At the locations where a change in direction of the transport plates 4 is necessary, a respective elastic stop region or stop element 45 is provided. The rollers 50, which move the transport plate 4 laterally, are driven.

To prevent jolts and impacts being transferred by adjacent transport plates 4, which engage each other, the transport plates 4 are formed at the facing, engaging sides with soft rubber inserts 31; additional lateral soft rubber inserts 31' are located on one of the side walls of the transport plates. It is to be noted that the elastic inserts 31, 31' are recessed with respect to the outer dimension of the transport plates 4 so that guidance of the transport plates 4 by the parallel side walls 48 is not impeded by friction of the rubber or other elastic material against the side walls. The movement of the transport plates 4, as shown, is in several respectively right angular directions.

The transport means to move the transport plates 4 are two spaced conveyor belts 3. The spacing of the conveyor belts 3 is such that the gap defined thereby, in the center, is sufficient to locate between the conveyor belts 3 a respective engagement presser plate 5 (FIGS. 1, 2) positioned at the respective work stations WS. The engagement or presser plates 5 are movable vertically between the conveyor belts 3 against the lower side of the transport plates 4, to lift the transport plates 4 off the conveyor belt 3 at the work stations. The transport plates 4 are lifted until they engage a counter bearing arrangement 28. Preferably, the bearing arrangement 28 is a three-point bearing secured, for example, by means of a U bracket to the frame 2; in FIG. 1, only one of the three-point counter bearing elements 28 is visible; in FIG. 5, the three counter bearing elements are shown schematically since any suitable arrangement can be used.

Referring again to FIGS. 1 and 2, a cross brace 10 is rigidly connected to the frame 2. The cross brace 10 carries a fluid cylinder-piston unit 8, preferably hydraulic, but it may be pneumatic; the piston cylinder arrangement 8 is stationary on the frame 2, is coupled to the presser plate 5, and used to lift the presser plate 5. A piston extension 22 engages the presser plate 5 centrally; it is coupled to the presser plate 5 by a screw 27 for tight connection. The presser plate 5 is precisely guided for vertical movement by one or more cylindrical bolts 25, rigidly connected to the presser plate, and vertically guided in guide sleeves 27 secured to or passing through the cross brace 10. The guide sleeves 27 are preferably located in the same cross brace which also carries the cylinder-piston unit 8 at a specific work station.

In accordance with a feature of the invention, a further cylinder-piston unit 6 is secured to the presser plate 5, for example by screws 20. The further or auxiliary hydraulic or pneumatic piston-cylinder unit 6 is used to first pre-position the respective transport plates at the work station. The auxiliary cylinder-piston unit 6 is secured to the presser plate 5 by screws 20, so that the entire auxiliary cylinder-piston unit 6 moves with the presser plate 5 in vertical direction. Preferably, the two cylinder-piston units 6, 8 are double-acting, that is, the piston can be subjected to fluid pressure on either side so that positive vertically upward or downward movement can be commanded. Other vertical and downwardly directed moving systems can be used, such as electromagnetic solenoids, with or without returning springs or the like. A hydraulic operation is preferred, since the engagement force can be readily selected within wide limits, can be easily changed, and can be made very high.

The movable piston extension 18 of the cylinder-piston unit 6 is operable in vertical direction. It is so located that, when moved upwardly, it will be located in interfering position with respect to the transport path of the transport plate 4; upon downward movement, it is removed from this interfering position. The piston extension 18 is formed as a positioning bolt 12 (FIGS. 1, 2) which, in its upper region, acts as a stopper or stop element for the transport plates 4. The upper region, preferably, is supplied with a ring 14 of noise damping material, preferably an elastomer, for example a rubber ring. The immediately adjacent portion of the positioning bolt 12 beneath the rubber ring 14 is conical, as seen at 16, and merges into a cylindrical portion 18 of larger diameter than the end portion of the extension 12, surrounded by the rubber ring 14. The cylindrical portion 18 is used for precise centering and positioning of the transport plate 4. The guide bolts 25 preferably extend from the upper region of the engagement or presser plates 5 and form additional centering and positioning elements, upon engagement with recesses 30 (FIGS. 5, 7) formed in the transport plates. At least one of the recesses, shown in FIG. 5 at 30', is open in the transport direction, to form a lateral slit. Preferably, all recesses 30 are open laterally (see FIG. 5).

Figures 6, 7:
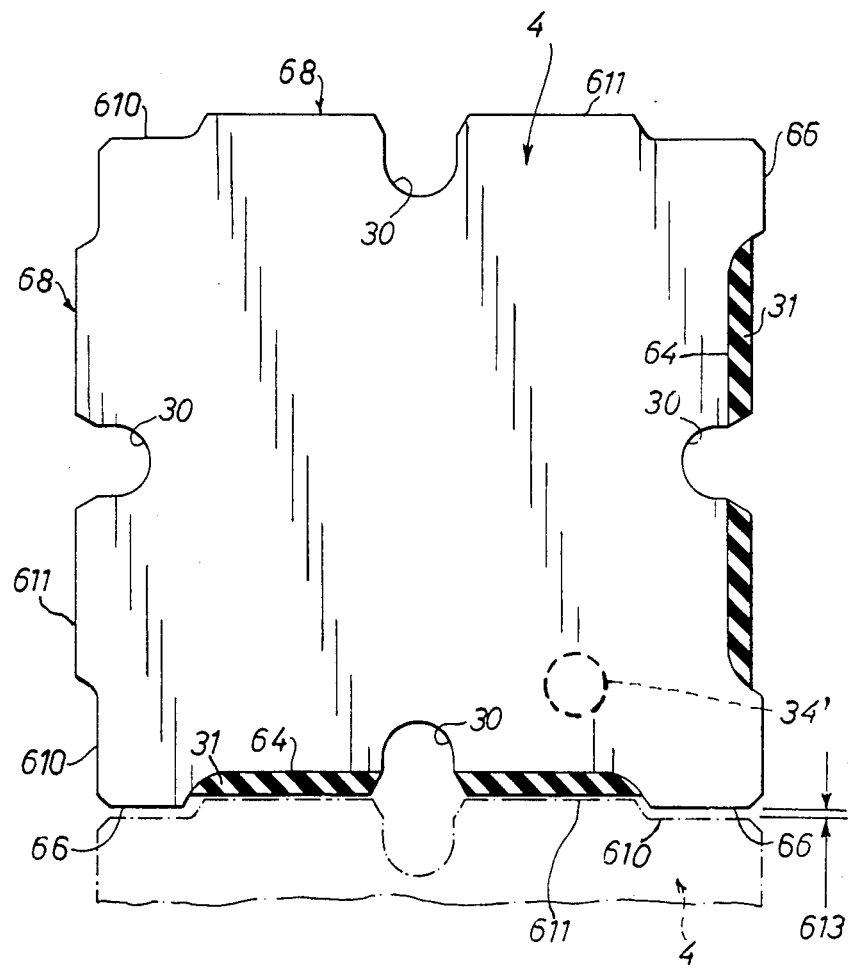
FIG. 6 is a top view of a transport plate particularly suitable for use in the assembly system.
FIG. 7 is a side view of the transport plate.

The transport plates 4—see also FIGS. 6 and 7—carry the work pieces 23 (FIG. 5) on which work is to be carried out at the respective work stations. The transport plates are formed with laterally open slits, which define the recesses 30. Preferably, all sides of the transport plates 4 are formed with at least one of such recesses 30, in rectangular or square plates, four such recesses 30 being provided (see FIG. 6). The two positioning elements 12, 25, and specifically the cylindrical portion 18, and 26, of the bolts 18 and 25, are dimensioned and sized to fit into the slits 30 and 30' for precisely and accurately positioning the transport plates 4 at the respective work stations WS.

OPERATION

Figure 1:
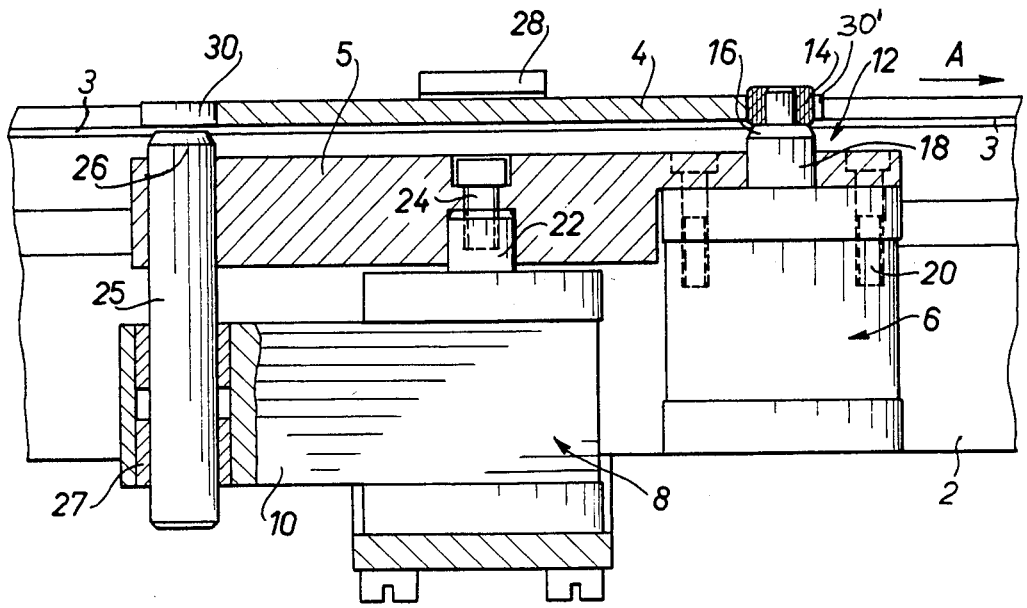
FIG. 1 is a fragmentary side view, partly in section, of the assembly system at a work station, in which a transport plate is being stopped by engagement with an elastic stop element.
Figure 2:
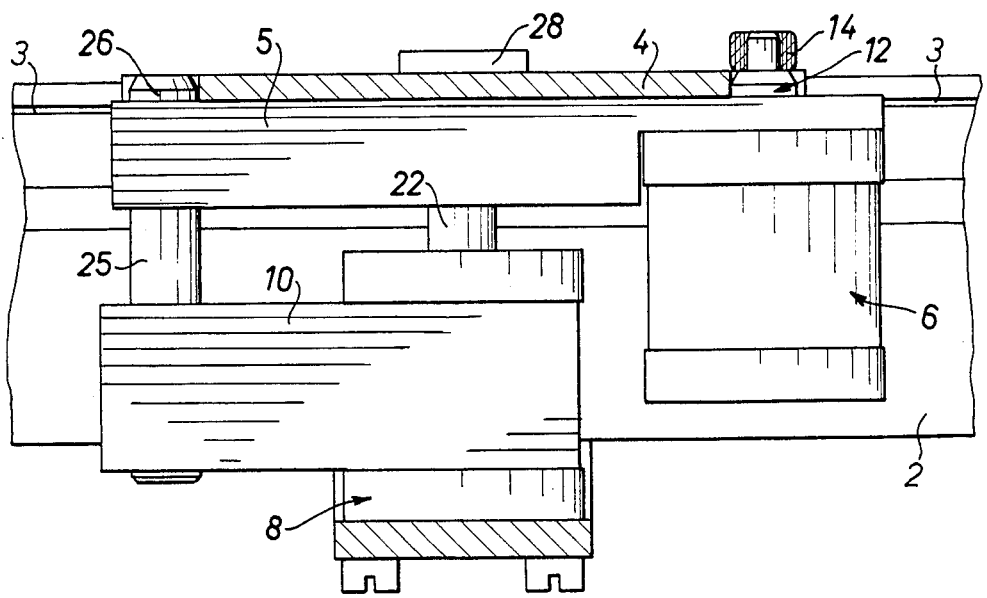
FIG. 2 is a fragmentary side view illustrating positioning of the transport plate in a precise location.

Let it be assumed that motor 42 is operating and drives the belts 3 through the gearing 44. A motor driving the belts 3 at the upper portion of FIG. 5 has been omitted for clarity. The speed of the operation of the belts 3 at the respective branches of the U-shaped arrangement need not be the same. When it is desired to stop a transport plate 4 at a desired work station, for example at a work station at the lower side of FIG. 5, the positioning bolt 12 is raised by supplying pressurized fluid, typically hydraulic pressure fluid, to the cylinder-piston unit 6, so that the piston extension 12 will be raised. The upper region of the extension 12, that is, the region which has the rubber ring 14 thereon, is placed in interfering position with respect to the movement of the transport plate. The next, arriving transport plate 4, arriving in direction of the arrow A, will be stopped by engagement of ring 14 in slit 30'. Shocks and noise are effectively eliminated by the rubber cushion formed by the ring 14. FIG. 1 illustrates the stopping position. At the next step, hydraulic pressure fluid is supplied to the cylinder-piston unit 8, moving its piston extension 22 in vertically upward direction (FIGS. 1, 2) so that the presser plate 5 together with the cylinder-piston unit 6, secured to the presser plate 5, is moved upwardly. Consequently, the guide bolt 26 will engage in the slit or recess 30 at the trailing side of the transport plate—with respect to the direction of movement of the belts 3, in the sense of arrow A (see FIG. 1) and, additionally, the cylindrical portion 18 of the piston extension 12 of the cylinder-piston unit 6 will be in a position to engage in the leading slit or recess 30'. Thus, the transport plate 4 is precisely positioned—first guided laterally by the guide surfaces or rails 48 secured to the frame and then guided in position by the two positioning elements 26 and 18, respectively, in the recesses 30 and 30'. The presser plate 5, in this movement, engages against the lower side of the transport plate 4 and lifts the transport plate 4 by a slight distance upwardly, lifting it off the moving conveyor belts 3. The lifting of the plate 5 is stopped by the stationary counter bearing system 28. Thus, the transport plate 4 is precisely positioned, vertically as well as in horizontal direction. The pressure on the presser plate 5 is retained during the working and/or assembly operations to be carried out on the work piece 23 at the respective work station, so that the transport plate 4 can accept also downwardly directed pressure (with respect to FIG. 2, for example), e.g. applied by drills, boring machines, or other machinery applied against the work piece. FIG. 2 illustrates the position of the transport plate 4 at a work station; the work piece 23 is not shown in FIG. 4 for simplicity.

After the respective work or assembly operation at the work station WS is finished, the piston-cylinder unit 8 is moved downwardly, for example by reversal of pressure, and, likewise, the piston-cylinder unit 6 is so controlled that the piston and the piston extension 12 thereof is retracted. This lowers the transport plate 4 again on the belts 3 and since the stop ring 14 has been dropped below the level of the transport plate, the transport plate can be moved by the conveyor belt 3 in continuous direction of the arrow A to the next work station or to a reversal or path change station as shown in FIG. 5.

Figure 4:
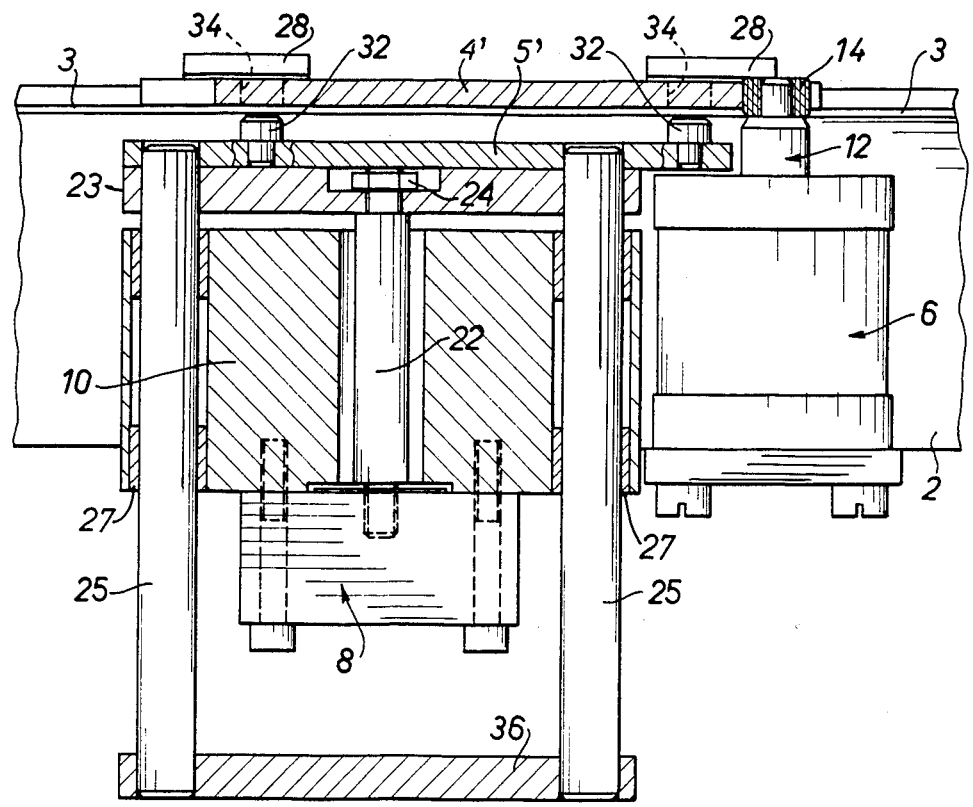
FIG. 4 is a fragmentary view of another embodiment of the system of FIG. 1 to stop the transport plate in advance of positioning.

FIG. 4 illustrates a modified arrangement of the stopping positioning and lifting mechanism to accurately position a transport plate 4 at a work station.

Figure 3:
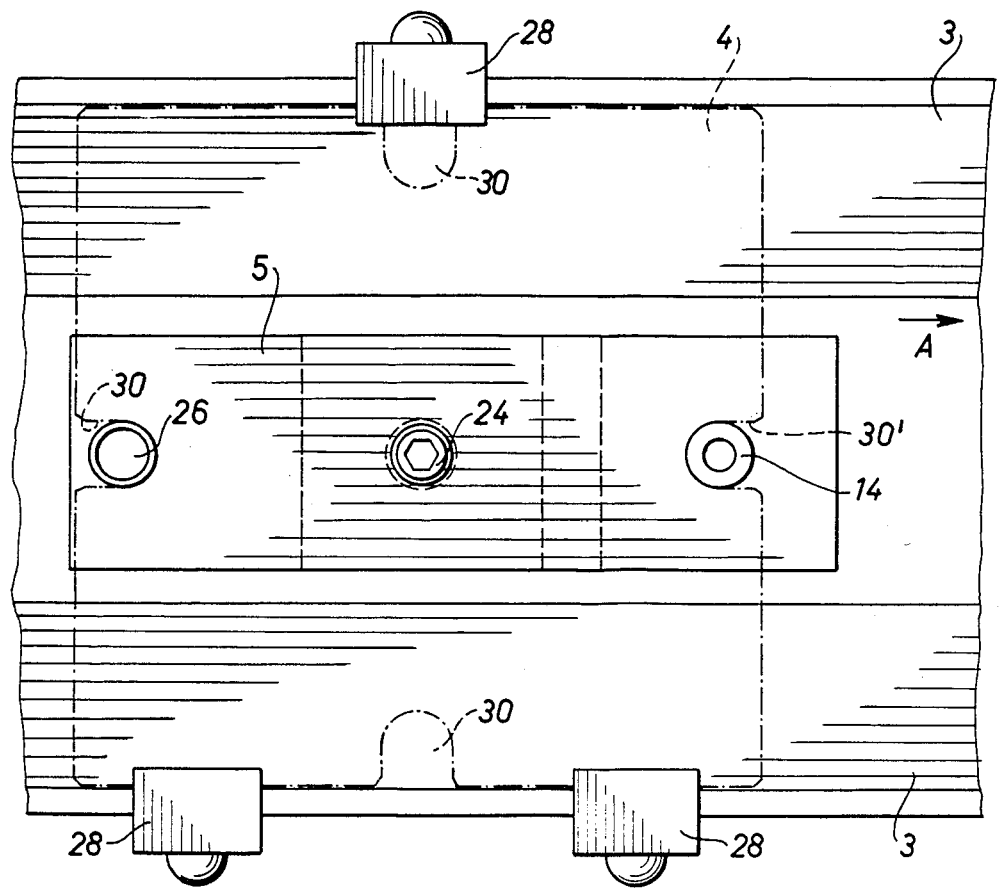
FIG. 3 is a fragmentary top view of the production line system at a work station, with the transport plate drawn in phantom, and the work piece removed.

The difference between the embodiment of FIG. 4 and the embodiment of FIGS. 1 and 2 is that both cylinder-piston units 6 and 8 can be moved independently of each other. The piston extension 12 with the rubber ring or bushing 14 is used only to stop the transport plate 4 moved by the conveyor belts 3. The precision positioning of the transport plate 4 then is carried out by two positioning bolts 32, secured to the presser plate 5'. The positioning bolts 32 are so located that they will accurately engage bores 34 in the transport plate 4. The cylinder-piston unit 6 is rigidly connected to the frame 2. The cylinder-piston unit 8, likewise, is rigidly connected to the frame 2. The presser plate 5 is guided by two vertical cylindrical posts 25 which are connected at the bottom by a cross-connecting plate 36 to form a rigid unit. The posts 25 are vertically accurately guided in guide bushings 27 located, for example, on the cross brace 10 of the frame 2. The vertical movement is transferred from the cylinder-piston unit 8 by the piston extension element 22, which is coupled, for example securely connected by screw 24, to the actual presser plate 5'. The presser plate 5' has the positioning elements 32 secured thereon, for engagement with suitable positioning holes or recesses 34. The positioning holes or recesses 34 may, for example, be located immediately opposite one of the counter bearing elements 28, as seen in FIG. 4. Of course, the positioning elements 32 may also be located to engage in the part-semicircular recesses 30 of the transport plate 4, as shown in FIG. 6. The operation, essentially, is similar to that described in connection with FIGS. 1-3, with the exception that the cylinder-piston unit 6 is extended solely to stop the plate 4', for example by engagement with one of the openings 30, and, after positioning of the plate by the positioning buttons or bolt elements 32, can be withdrawn immediately. The piston-cylinder unit 8, as before, lifts the plate 4' off the transport or conveyor belts 3, and engages the transport plate 4' with the work pieces 23 (not shown in FIG. 4) thereon, against the counter bearing elements 28.

For minimum noise in operation, the transport plate 4 preferably is constructed as shown in FIGS. 6 and 7. The transport plates may, of course, also be used with other systems, and particularly with non-synchronously operating production lines, where transport plates are apt to impinge against each other.

In a preferred form, the transport plates 4 are essentially square unitary plates, of a material resistant against bending, preferably steel or aluminum. Suitable dimensions may be made in various stock or standard sizes, for example about 16×16 cm (roughly 6" square), 20×20 cm (roughly 8" square), 26×26 cm (roughly 10" square), all for example of about 6 mm (roughly ¼") thickness. The narrow side surfaces form guide surface pairs 66, 68, one pair, each, extending at right angle to the other pair. An essentially semicircular outwardly open recess 30 is formed in the center of each one of the sides, to receive the stop element 14 (FIG. 1) and/or the centering bolts or posts 25. If the plate 4 is to be used in the system of FIG. 4, above, additional or separate positioning holes or recesses 34' may be formed therein.

The two right-angle sides 66 are recessed inwardly. An elastic layer 31, for example of soft rubber, plastic, or the like, having a Shore hardness of about 50°, is suitable. The thickness of the soft rubber strip may be about 5 mm. It can be attached to the edge of the plate 4, at the positions shown in FIG. 6, by adhesion, vulcanizing on the edge, or the like. At each side of the elastic layer 31, metallic guide surface portions forming the side walls 66 will remain; these portions 66 extend, with a chamfer, to the edges of the plate. The recess in which the elastic strip 31 is retained may cover between about half to two thirds of the length of the respective side wall.

The opposite narrow sides 68 are each formed with a projecting portion 611. The projecting portion—looked at in the direction of transport, arrow A, FIG. 1—is slightly longer than the setback of the elastic layer 31 with respect to the guide surfaces 66. If two adjacent transport plates 4 or 4' impinge against each other, for example upon a back-up of transport plates, the projecting surface 611 will always engage with an elastic layer 31 in the recess 64 of the opposite matching guide surface 66 of the adjacent transport plate. Thus, metal-to-metal contact of two transport plates is avoided. Slight play between the side walls 48 (FIG. 5) and the projecting portions 611 and the guide surfaces 66 should be provided.

The dimension of the projecting portions 611, the depth of the recess 64, and the thickness of the elastic layer 31 should be so matched to each other that a small safety gap or spacing 613 will be left between adjacent plates, as shown in FIG. 6. Of course, the advantage of the arrangement is obtained only if the respective plates 4, 4' are positioned such that the elastic inserts 31 always face in the same direction, so that the projecting surfaces 611 will always be next to an elastic insert 31.

Except for the elastic layers 5, the transport plates 4, 4' are unitary and made of a single block or stamping. The transport plate is mirror-symmetrical with respect to a diagonal. The region of the side walls 68 adjacent the projections 611, shown at 610 in FIGS. 6 and 7, may have the same dimension with respect to a center point of the transport plate as the guide surfaces 66.

The plan view of the transport plates need not be square. Rectangular arrangements, hexagons, octagons or 12-cornered (dodecagonal) plates may be provided, arranged in similar manner. In each instance, half of the side walls will be formed with recesses 64, in which the elastic layers 31 are placed, the opposite side being formed with the projections 611 to fit into the recess, with the clearance 613, for engagement with the elastic layer. Thus, a hexagonal plate requires three elastic layers, an octogonal plate four elastic layers, and a dodecagonal plate six elastic layers, each with oppositely placed impingement and engagement surfaces 611. Such hexagonal, octogonal or dodecagonal transport plates are particularly suitable if the production line is laid out so as to have not right-angle portions, but portions which extend at an angle of 60°, 45°, or 30° with respect to each other.

The transport plates are securely guided by guide rails 48, usually present already on most production line systems; upon bumping against each other, impacts are effectively damped and noise is substantially reduced. The damping elastomer layer is recessed with respect to the guide surfaces, so that upon movement along the guide rails 48 of the production line path, the elastomer will not wear by friction against the stationary side walls or guide rails.

Various changes and modifications may be made, and features described in connection with any one of the embodiments may be used with any of the others, within the scope of the inventive concept.

I claim:

1. Production line system for working on work pieces (23) at selected work stations (WS) having continuously movable transport means (3), arranged to move the work pieces in a transport path along which path the work stations are located, said transport means defining a gap therebetween;

a plurality of transport plates (4) positioned on the transport means and supporting the work pieces to move the work pieces along said path, while permitting working on the work pieces at the work stations, and comprising means for positioning the transport plates (4) at selected work stations (WS) in predetermined position, while disengaging the transport plates from the transport means (3), wherein the transport plates are formed with positioning recesses (30,30'), at least one (30') of which is open in transport direction;

said positioning means including vertically movable locating means (12, 26) located for vertical movement in said gap and engageable with at least one of said recesses (30) in the transport plates;

a vertically operated presser plate (5) operable to move in said gap in a vertical direction and engageable with a bottom surface of a selected transport plate (4) arriving at a selected work station (WS) to thereby lift the transport plate at the selected work station off the transport means (3);

stationary counter holding means (28) located at the respective work stations and positioned above an upper surface portion of the transport plates, while leaving free access to the work pieces;

wherein the locating means include a locating element (26) engageable with one of said positioning recesses (30), and rigidly connected to said presser plate (5);

first power means (8) for moving the presser plate vertically;

wherein the positioning means further include a vertically operable second power means (6) secured to and supported from the presser plate (5) and a vertically operable post or rod (12) operated by said second power means and selectively movable into a first, or stop position interfering with movement of the transport plate (4) on said transport means (3) and additionally movable into a second position for positively locating the transport plate at the selected work station.

said bolt or post (12) having an upper region and a lower region, the upper region including stop means (14) engageable with the recess (30') open in transport direction of the transport plate and being moved towards the selected work station to arrest a moving transport plate when said post or rod is in said first position, the lower region forming part of said locating means and being engageable with said recess (30) of the transport plate when the post or rod is in said second position.

2. The system of claim 1, wherein the stationary counter holding means (28) comprises a stationary three-point counter bearing arrangement, engageable with three spaced, triangularly positioned surfaces against an upper surface of the transport plates (4, 4').

3. The system of claim 1, wherein said stop element includes an elastic or rubber-like stopper located at the upper region of the stop element for soft engagement with the transport plate.

4. The system of claim 1, wherein at least one of said power means comprises at least one of:
a hydraulic cylinder-piston unit;
a pneumatic cylinder-piston unit;
an electric solenoid.

5. The system of claim 1, wherein the transport plates (4) are essentially square and is formed with approximately semicircular recesses (30) located approximately centrally at the sides of the square transport plates, said recesses being engageable by said locating means.

6. In the system of claim 1, wherein each of said transport plates is polygonal, and has at least four sides;
two sides being formed with inwardly extending depressed recesses (64), opposite sides being formed with outwardly extending projections (611); and
shock-absorbing elastic material (31) being located within said inwardly extending recesses, said outwardly extending projections of a plate fitting against the shock-absorbing elastic material (31) located in the inwardly depressed recesses (64) of a neighboring plate on said production line, the extent of projection and the extent of depression being dimensioned to space adjacent plates being transported by said transport means (3) by a small gap (613), the projections, upon transport of the transport means engaging a neighboring plate softly with minimum noise and elimination of shock due to said shock absorbing elastic material in the inwardly extending depressed recesses (64).

7. A transport plate comprising a polygonal plate having at least four sides,
two sides being formed with inwardly extending depressed recesses (64), opposite sides being formed with outwardly extending projections (611); and
shock-absorbing elastic material (31) being located within said inwardly extending recesses, said outwardly extending projections of a plate fitting against the shock-absorbing elastic material (31) located in the inwardly depressed recesses (64) of an adjacent neighboring plate, the extent of projection and the extent of depression being dimensioned to space adjacent plates by a small gap (613), the projections engaging the shock-absorbing material (31) in the inwardly depressed recesses of a neighboring plate softly with minimum noise and elimination of shock due to said shock-absorbing elastic material in the inwardly extending depressed recesses (64).

8. The transport plate of claim 7, wherein the plate is formed with approximately semicircular recesses (30) located approximately centrally at the sides of the transport plate, said recesses being engageable by a locating means.

9. The transport plate of claim 7, wherein the transport plate is essentially square.

10. The transport plate of claim 7, wherein the depressed recesses extend over only a portion of the length of the respective side of the transport plate, leaving a guide surface (66) extending beyond the outer dimension of the shock absorbing elastic material.

11. The transport plate of claim 7, including locating means (30, 34') formed on the transport plate for engagement with locating pins or posts (12, 26, 32) at a work station (WS), said locating means including at least one essentially semicircular recess located centrally on at least one side wall of the plate.

12. The transport plate of claim 7, wherein the plate is mirror-image symmetrical with respect to a diagonal line through the plate.

13. The transport plate of claim 7, wherein the plate is polygonal with an even number of corners;
and wherein the shock absorbing elastic material (31) and the outwardly extending projections (611) are located at respectively opposite sides, in relation to a center point of the plate.

14. Production line system for working on work pieces (23) at selected work stations (WS) having continuously movable transport means (3), arranged to move the work pieces in a transport path along which path the work stations are located, said transport means defining a gap therebetween;
a plurality of transport plates (4) positioned on the transport means and supporting the work pieces to move the work pieces along said path, while permitting working on the work pieces at the work stations,
and comprising
means for positioning the transport plates (4) at selected work stations (WS) in predetermined position, while disengaging the transport plates from the transport means (3),
wherein the transport plates are formed with positioning recesses (30,30'), at least one (30') of which is open in transport direction;
said positioning means including
vertically movable locating means (12, 26) located for vertical movement in said gap and engageable with at least one of said recesses (30) in the transport plates;
a vertically operated presser plate (5) operable to move in said gap in a vertical direction and engageable with a bottom surface of a selected transport plate (4) arriving at a selected work station (WS) to thereby lift the transport plate at the selected work station off the transport means (3);
stationary counter holding means (28) located at the respective work stations and positioned above an upper surface portion of the transport plates, while leaving free access to the work pieces;
wherein the locating means include
a combined stopping and locating element for the transport plates, and includes a locating pin or bolt (12) engageable with said one of the recesses (30') of the transport plate open in transport direction, said pin or bolt having an upper elastic portion, an intermediate conical portion and a lower locating portion, said pin or bolt being vertically movable in discrete positions for, respectively, engagement of the upper elastic portion with the transport plate to stop a transport plate arriving at a work station and additional movement to place the conical portion and then the locating portion against the matching recess (30') in the transport plate for positioning and locating said transport plate at the work station; and wherein said locating means further includes an additional locating pin or bolt or post (26) engageable with another recess (30) of the transport plate.

15. The system of claim 14, wherein the stationary counter holding means (28) comprises a stationary three-point counter bearing arrangement, engageable with three spaced, triangularly positioned surfaces against an upper surface of the transport plates (4, 4').

16. The system of claim 14, wherein the transport plates (4) are essentiall square and formed with approximately semicircular recesses (30) located approximately centrally at the sides of the square transport plates, said recesses being engageable by said locating means.

17. In the system of claim 14, wherein each of said transport plates is polygonal, and has at least four sides;
two sides being formed with inwardly extending depressed recesses (64), opposite sides being formed with outwardly extending projections (611); and
shock-absorbing elastic material (31) being located within said inwardly extending recesses, said outwardly extending projections of a plate fitting against the shock-absorbing elastic material (31) located in the inwardly depressed recesses (64) of a neighboring plate on said production line, the extent of projection and the extent of depression being dimensioned to space adjacent plates being transported by said transport means (3) by a small gap (613), the projections, upon transport of the transport means engaging a neighboring plate softly with minimum noise and elimination of shock due to said shock absorbing elastic material in the inwardly extending depressed recesses (64).

18. Production line system for working on work pieces (23) at selected work stations (WS) having
continuously movable transport means (3), arranged to move the work pieces in a transport path along which path the work stations are located, said transport means defining a gap therebetween;
a plurality of transport plates (4) positioned on the transport means and supporting the work pieces to move the work pieces along said path, while permitting working on the work pieces at the work stations,
and comprising
means for positioning the transport plates (4) at selected work stations (WS) in predetermined position, while disengaging the transport plates from the transport means (3), wherein the transport plates are formed with positioning recesses (30,30');
said positioning means including
vertically movable locating means (12, 26) located for vertical movement in said gap and engageable with at least one of said recesses (30) in the transport plates;
a vertically operated presser plate (5) operable to move in said gap in a vertical direction and engageable with a bottom surface of a selected transport plate (4) arriving at a selected work station (WS) to thereby lift the transport plate at the selected work station off the transport means (3);
stationary counter holding means (28) located at the respective work stations and positioned above an upper surface portion of the transport plates, while leaving free access to the work pieces;
wherein the locating means include
at least two locating elements (32) rigidly connected to the presser plate (5) and engageable with selected ones of said positioning recesses (30, 34, 34') for positively locating the respective transport plate;
first power means (8) coupled to the presser plate (5') for moving the presser plate vertically upwardly;
guide means (25) for guiding the upward movement of said presser plate (5');
a stop element (14); and
vertically operable second power means (6) independently moving said stop element (14) between an interfering and non-interfering position with respect to the transport plates (4) being transported by said transport means (3).

19. The system of claim 18, wherein at least one of said power means comprises at least one of:
a hydraulic cylinder-piston unit;
a pneumatic cylinder-piston unit;
an electric solenoid.

20. The system of claim 18, wherein the stationary counter holding means (28) comprises a stationary three-point counter bearing arrangement, engageable with three spaced, triangularly positioned surfaces against an upper surface of the transport plates (4, 4').

21. The system of claim 18, wherein said stop element comprises a vertically movable pin or bolt, and an elastic or rubber-like stopper located at the upper region of said pin or bolt for soft engagement with the transport plate.

22. In the system of claim 18, wherein each of said transport plates is polygonal, and has at least four sides;
two sides being formed with inwardly extending depressed recesses (64), opposite sides being formed with outwardly extending projections (611); and
shock-absorbing elastic material (31) being located within said inwardly extending recesses, said outwardly extending projections of a plate fitting against the shock-absorbing elastic material (31) located in the inwardly depressed recesses (64) of a neighboring plate on said production line, the extent of projection and the extent of depression being dimensioned to space adjacent plates being transported by said transport means (3) by a small gap (613), the projections, upon transport of the transport means engaging a neighboring plate softly with minimum noise and elimination of shock due to said shock absorbing elastic material in the inwardly extending depressed recesses (64).

* * * * *